(12) United States Patent
Bolton et al.

(10) Patent No.: US 8,281,550 B1
(45) Date of Patent: Oct. 9, 2012

(54) IMPACT AND FIRE RESISTANT WINDOWS

(75) Inventors: Nelson Bolton, Trumbauersville, PA (US); W. Novis Smith, Philadelphia, PA (US); Elizabeth Wimmer, Palm, PA (US)

(73) Assignee: AGP Plastics, Inc., Trumbauersville, PA (US)

( * ) Notice: Subject to any disclaimer, the term of this patent is extended or adjusted under 35 U.S.C. 154(b) by 0 days.

(21) Appl. No.: 12/928,535

(22) Filed: Dec. 14, 2010

Related U.S. Application Data

(63) Continuation-in-part of application No. 12/462,884, filed on Aug. 11, 2009.

(51) Int. Cl.
*E04C 2/54* (2006.01)

(52) U.S. Cl. .................. 52/786.11; 52/204.5; 52/656.3; 428/921; 442/136

(58) Field of Classification Search .......... 52/786.1, 52/786.11, 786.12, 788.1, 656.3, 204.5, 204.591, 52/204.593; 428/920, 921; 442/136, 140, 442/141
See application file for complete search history.

(56) References Cited

U.S. PATENT DOCUMENTS

| | | | | |
|---|---|---|---|---|
| 3,311,517 | A | * | 3/1967 | Rankin et al. ................. 156/104 |
| 3,396,129 | A | * | 8/1968 | Yeadon et al. ................ 523/179 |
| 3,845,067 | A | * | 10/1974 | Masa ............................ 524/405 |
| 4,173,668 | A | * | 11/1979 | Hentzelt et al. ................. 428/34 |
| 4,264,681 | A | * | 4/1981 | Girard et al. .................. 428/429 |
| 4,913,847 | A | * | 4/1990 | Tunker ......................... 252/606 |
| 5,124,208 | A | * | 6/1992 | Bolton et al. ................. 428/412 |
| 5,449,560 | A | * | 9/1995 | Antheunis et al. ............. 428/447 |
| 5,496,640 | A | * | 3/1996 | Bolton et al. ................. 428/421 |
| 5,543,230 | A | * | 8/1996 | von Bonin et al. ............ 428/432 |
| 5,696,288 | A | * | 12/1997 | Gutierrez et al. ............. 562/583 |
| 5,885,713 | A | * | 3/1999 | von Bonin et al. ............ 428/427 |
| 5,979,932 | A | * | 11/1999 | Jourdaine et al. ........... 280/730.2 |
| 6,159,606 | A | * | 12/2000 | Gelderie et al. .............. 428/426 |
| 7,090,906 | B2 | * | 8/2006 | O'Keeffe ........................ 428/38 |
| 8,039,077 | B2 | * | 10/2011 | Miller et al. .................... 428/68 |
| 2007/0053088 | A1 | * | 3/2007 | Kranz et al. ................... 359/883 |
| 2010/0173084 | A1 | * | 7/2010 | Piana et al. ................... 427/379 |

* cited by examiner

*Primary Examiner* — William Gilbert
(74) *Attorney, Agent, or Firm* — John Lezdey

(57) ABSTRACT

The present invention relates to optically clear fire resistant and impact resistant windows having at least one air gap and at least one fire resistant layer. Optionally there is also an anti-spall layer.

18 Claims, 1 Drawing Sheet

IMPACT AND FIRE RESISTANT WINDOWS

RELATED APPLICATIONS

This is a continuation-in-part of application Ser. No. 12/462,884 filed Aug. 11, 2009.

FIELD OF THE INVENTION

The present invention relates to optically clear fire resistant and impact resistant windows or panes which contain at least one air gap adjacent the fire resistant layers.

BACKGROUND OF THE INVENTION

Previous attempts have been made in the prior art to produce a fire-resisting glass window containing an aqueous gel or liquid medium between fire resistant glass sheets. The aqueous gel contained mineral salts or polymer able to produce an insulating foam under the effect of heat radiation. Thus, the gel polymerizes when exposed to fire, thereby producing an insulating foam. The addition of mineral salts, however, quickly resulted in a drop in the optical qualities of the fire resistant glass window, i.e. especially a drop in the transparency.

Another defect of multiple panes of fire resistant glass windows containing an aqueous gel between the glass sheets is the gel mobility or fluidity when the glass is subject to fire's extreme temperatures. In the case of fire, it has been found that the gel has a tendency to collapse and expand, thereby forming relatively large aerated zones. Often the collapse and expansion continues until one large aerated zone is formed. Meanwhile, the panes exposed to the fire deform, break and finally fall away from the door.

Additional considerations arise when a multiple pane fire resistant window is subject to repeated shocks as in its role as the main element of a fireproof door. Door mounted aqueous film-multiple pane units are subject to bubbling after a certain number of jarring shocks. The bubbles can possess relatively large volumes and are mobile along the inside surfaces of the glass sheets. Thus, the aqueous film is detachable from a glass sheet's inside face. The combination of the above traits results in an aqueous gel-multiple pane door which exhibits poor fireproofing properties.

High temperature glasses have been developed based on lithium alumina silicates and other high temperature glass which are difficult to manufacture and expensive in general and also are difficult to make in sizes larger than 30" wide. These are still limited in that they also still melt slowly at the temperature of the required testing and therefore still have difficulty meeting the 900° C. flame test for 1 hour and do not insulate the back pane of the window causing excessive heat transfer. In addition, the haze levels of this glass are higher than standard window panes (reduced transparency).

U.S. Pat. No. 4,264,681 to Girard et al, which is herein incorporated by reference, relates to fire resistant windows having spaces filled with an aqueous gel consisting of organic titanates, organic zirconates and silanes. The gel tends to bubble under jarring shock.

U.S. Pat. No. 5,449,560 to Antheunis, which is herein incorporated by reference, relates to liquid curable compositions prepared from polydialkylsiloxanes and polyhydrogen organosilanes as an interlayer for a laminate of glass.

U.S. Pat. No. 5,124,208 to Bolton et al, which is herein incorporated by reference, relates to a window assembly which can be used by the present invention.

Other fire resistant windows of interest include U.S. Pat. Nos. 7,090,906; 6,159,606; 5,885,713; 5,543,230 and 5,696,288, which are herein incorporated by reference.

PCT/US2008/011144 which is herein incorporated by reference, discloses anti-spall windows which can be used in the present invention.

It is understood that the term "plastic layer" includes polymeric sheets or films which are single layers or laminates of one or more sheets or films

SUMMARY OF THE INVENTION

The present invention relates to improved transparent fire resistant and impact resistant windows and window assemblies having at least one air gap adjacent a fire resistant layer.

More particularly, the window or window assembly construction comprises according to one embodiment:
  a) an outer glass or plastic layer;
  b) a transparent fire resistant layer adjacent said glass or plastic layer;
  c) optionally a second glass or plastic layer,
  d) at least one air gap; and
  e) a glass or plastic layer forming said gap with said outer glass and/or plastic layer.

This type of window construction is useful wherein flame or impact is expected to occur on the side of the glass or plastic layer which is on the outside.

Advantageously, an anti-spall layer of tempered or chemically strengthened glass sheets have a thickness less than about 2 mm preferably with an inter layer of sodium or lithium neutralized ionomer having a thickness not more than 6 mm and an acid content of about 15 to 22% by weight that is used as a cover layer or laminating layer on the front and rear of the window.

According to another embodiment of the invention there is provided a window or window assembly in an order comprising;
  1) an outside glass and/or plastic layer on the front and rear of the window;
  2) a transparent fire resistant layer adjacent each of glass or plastic layers;
  3) a second glass or plastic layer adjacent said fir resistant layer;
  4) an air gap adjacent each of said second layers; and
  5) an intermediate glass or plastic layer separating said air gap from each other. The window may be symmetrical or asymmetrical.

It is therefore an object of the invention to provide a transparent fire resistant and impact resistant window or window assembly.

It is yet another object of the invention to provide transparent structures which can be used in automobiles, trains, and doors.

The objects and advantages of the invention will be better understood from a reading of the Description of Preferred Embodiments and the Drawings.

DESCRIPTION OF THE PREFERRED EMBODIMENTS

According to the invention there is provided improved transparent windows and window assemblies which have greater fire resistance and impact resistance.

According to one embodiment of the invention the window or window assembly comprises;

a) an outer glass and/or plastic layer;
b) a transparent fire resistant layer adjacent the glass or plastic layer;
c) optionally a second glass or plastic layer;
d) an air gap adjacent said fire resistant layer; and
e) a second glass or plastic layer forming the air gap.

Advantageously, there is provided an anti-spall layer on at least one of the outer surfaces of window that impact is expected to occur.

Figure 1:
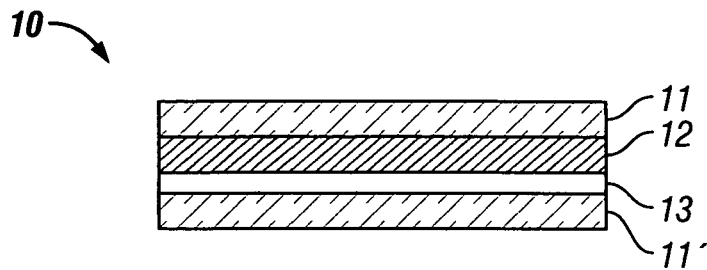
FIG. 1 is a top cross-sectional view of a window pane of the invention in its simplest form.

As shown in FIG. 1 of the drawings, there is provided a transparent window (10) which an outer glass or plastic layer (11) is placed so as to face the direction of probable impact. A fire resistant pane or layer (12) is adjacent the layer (11) and another glass or plastic layer (11) is separated by an air gap (13) to form the window.

Separation of layer (12) from layer ($11^1$) can be made by using spacers or by a frame around the edge of the window (10) with separators or when in a window structure which holds each layer which is known in the prior art. The edges can also be lined with a suitable adhesive binder to form a seal and hold the combination together and maintain the air gap.

Figure 2:
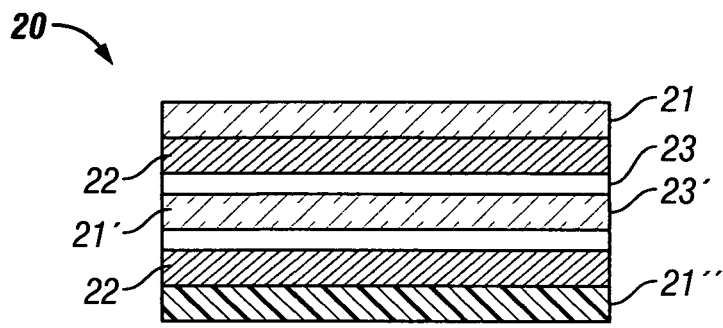
FIG. 2 is a top cross-sectional view of a window pane of the invention for use for security with multiple air gaps.

As shown in FIG. 2, a window (20) comprises;

A) an outer glass or plastic layer (21);
B) a fire resistant layer (22) adjacent the layer (21);
C) a first air gap (23);
D) an intermediate glass or plastic layer ($21^1$) forming the first air gap (23);
E) a second air gap ($23^1$);
F) a second fire resistant layer ($21^1$) forming the air gap ($23^1$) and
G) a further glass or plastic layer ($21^1$) which forms the window (20).

Optionally, the second fire resistant layer can comprise a gel.

The window can be formed using a window assembly structure which provides the separation to form the air gaps. Also, the window may be sealed along the edges with an adhesive, frame or with an assembly structure which can maintain the air gaps or the use of separators. This window (20) is suitable for use in security structures and where fire or impact can appear on either or both sides.

Figure 3:
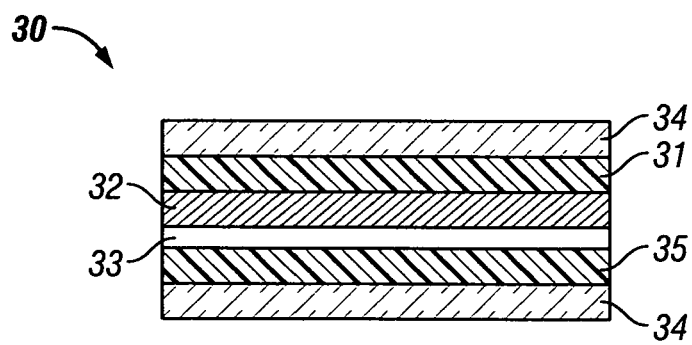
FIG. 3 is a top cross sectional view of a window of the invention with anti-spall protection.

As shown in FIG. 3, a window (30) similar to window (10) can be formed except that a thin anti-spall layer or layers (34) can be placed on the outside surfaces of the window. The window can further comprise a glass or plastic layer (34) having an intermediate air gap (33) and a fire resistant layer (35) sandwiched between glass or plastic layers.

Figure 4:
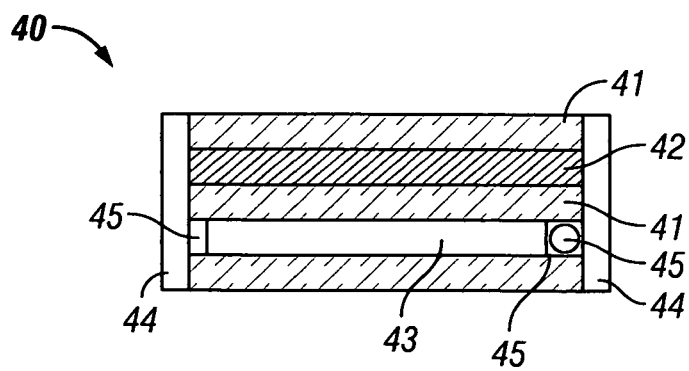
FIG. 4 is a top cross-sectional view of a window of the invention with separators in the air gap.

FIG. 4 shows a window (40) wherein an air gap (43) is formed between two glass or plastic layers (41) and the fire resistant layer (42) is also sandwiched between a pair of glass or plastic layers (41). The air gap is formed with separators (45) and the sides are bound with adhesive strips (44).

The anti-spall layers are useful for windows which are less than 8 mm in thickness. The anti-spall layer can be a tempered or chemically strengthened glass and/or an ionomer as described in PCT Application PCT/US2008/011144.

The fire resistant layer used in the present invention can comprise any of the known fire resistant gels such as disclosed in U.S. Pat. No. 4,264,681 or fire resistant panes disclosed in U.S. patent application Ser. No. 12/462,884 which are herein incorporated by reference.

A preferred composition for forming a fire resistant pane of the invention comprises;

a) about 10 to 25% by weight of Tris (hydroxymethyl) aminomethane;
b) about 10 to 25% by weight of ammonium dibasic phosphate;
c) about 30 to 40% by weight of sodium borate decahydrate; and
d) about 10 to 30% by weight of water.

The plastic layers which are used can be single layers or laminates which are high impact resistant. Such plastics include polycarbonates, polyurethanes, acrylics, ionomers and polyvinyl butyral.

The ionomers which can be used in the present invention include SURLYN® from Dupont, NOVIFLEX® and IONOPLAST® from AGP Plastics.

The thickness of the windows will depend on their utility and the type of plastic utilized. A typical window comprises about 3 mm glass/about 1.52 mm FR pane/about 1 mm air gap/3 mm glass for a panel 1.25 m×1.55 m.

For most other windows the air gap is generally about 2 mm.

The interlayers can comprise about 4-6 mm of glass or plastic.

It has been found that the fire resistance of the fire resistant window is significantly improved by how the fire resistant layers or panes and the glass layers are arranged and the relative thicknesses of these respective layers. In addition, it was found that air gap layers behind the FR layers/panes are important to accommodate the expansion of the FR layers as the flame impinges on the surface of the overall FR window and minimizes the distortion of the overall window during the impingement of fire. This air gap with a thinner pane of glass provide an "expansion joint" or purpose during the heat up and expansion of the face of the window, or the FR layers become intumescent and swell, and the expansion of the window body itself occurs under direct flame and heat impingement. The effectiveness of the FR window is measured by length of time the window withstands a direct impinging flame at 900° C., and separately by the length of time the window holds and prevents the temperature on the opposing side away from the flame from rising above 100° C. so as to protect people and materials on the other side of the window.

The air gap in combination with the FR layer improves the performance of the FR layer and the overall FR window against flame by maintaining the integrity of the glass panes and the FR layer longer during the impingement of the heat and flame. Spacers of a laminating plastic or an adhesive binder are used around the interior edges of the windows to maintain the air gaps.

Example 1

Preparation of FR Layer

Following the procedure of application Ser. No. 12/462,884, to 25 g of DI water at 50° C. is added with stirring 40 g of Tris (hydroxymethyl) aminomethane, 40 g of ammonium dibasic phosphate, 75 g of sodium borate decahydrate.

The mixture was heated up to 115-120° C. to boil off water. The resultant clear viscous liquid was poured out into a space between two panes of glass. The FR pane which was formed was optically clear and withstood 900° C. flame for 30 minutes.

When placed in a window assembly of a thickness of 1-5 inches, the front tempered glass pane remains in place. The back tempered glass pane remains cool to hand touch up to 50 minutes into test and never exceeds 200° C.

Example 2

Preparation of Pane

On a layer of IONOPLAST® of a thickness of 0.75 mm was stacked a 0.5 mm layer of the FR pane of Example 1 and a chemically strengthened glass plate of 0.75 mm thickness that was separated from the FR pane by PRIMACORE®, an adhesive along the edge so as to form an air gap of about 0.5 mm.

The assembly was placed in a so-called "polymer bag" as disclosed in U.S. Pat. No. 3,311,517. The bag comprised an outer ply of polyethylene terephthalate and an inner ply of polyethylene. The bag was inserted into a second bag of the same material, evacuated and sealed. The sealed unit was placed in an autoclave at 255° F. for three minutes under 150-200 psi pressure in a vacuum. The unit was then cooled to room temperature and unwrapped for use in a window assembly.

If desired, a chemically strengthened glass of about 0.25 mm can be placed over the ionomer layer as an anti-spall layer.

What is claimed is:
1. A transparent fire resistant and impact resistant window comprising;
 a) an outer first glass and/or plastic layer;
 b) a transparent fire resistant layer adjacent said outer first layer which comprises about 10-25% by weight of underline Tris (hydroxymethyl) aminomethane, about 10 to 25% by weight of ammonium dibasic phosphate and about 30 to 40% by weight of sodium borate decahydrate;
 c) a second glass or plastic layer;
 d) an air gap formed by said layers of b) and c).
2. The window of claim 1 wherein the first and second layers are plastic layers, the plastic layers comprise a laminate of polymeric layers.
3. The window of claim 1 wherein the first and second layers are glass layers, wherein the glass layers are tempered or chemically treated glass.
4. The window of claim 1 wherein the first and second layers are plastic layers, the plastic layers are selected from the group consisting of polycarbonate, ionomer, polyvinyl butyral and polyurethane.
5. The window of claim 1 wherein said fire resistant layer is a gel.
6. The window of claim 1 wherein said fire resistant layer is a transparent pane.
7. The window of claim 1 wherein said air gap is about 0.25 to 2 mm.
8. The window of claim 1 of claim 1 further comprising a second air gap.
9. The window of claim 1 comprising spacers for said air gap.
10. The window of claim 1 comprising an anti-spall layer covering the outer first layer.
11. A window assembly comprising the window of claim 1.
12. A transparent fire resistant and impact resistant window comprising;
 a) an outer first glass and/or plastic layer;
 b) at least one transparent fire resistant layer which comprises about 10 to 25% by weight of underline Tris (hydroxymethyl) aminomethane, about 10 to 25% by weight of ammonium dibasic phosphate and about 30 to 40% by weight of sodium borate decahydrate;
 c) an air gap formed between a) and b); and
 d) spacing means in said air gap.
13. The window of claim 12 including an anti-spall layer on said outer layer.
14. The window of claim 12 further comprising a second fire resistant layer and a second air gap.
15. The window of claim 12 wherein one of said fire resistant layers is a fire resistant gel.
16. The window of claim 12 which is wherein said window is symmetrical.
17. A window assembly comprising the window of claim 12.
18. A window comprising;
 i) a first glass layer;
 ii) a fire resistant layer adjacent said first layer which comprises about 10 to 25% by weight of underline Tris (hydroxymethyl) aminomethane, about 10 to 25% by weight of ammonium dibasic phosphate and about 30 to 40% by weight of sodium borate decahydrate;
 iii) an ionomer layer;
 iv) an air gap adjacent said ionomer layer; and a second glass layer.

\* \* \* \* \*